(12) United States Patent
Hatti et al.

(10) Patent No.: US 7,864,865 B2
(45) Date of Patent: Jan. 4, 2011

(54) LINE ADDRESS COMPUTER FOR CALCULATING THE LINE ADDRESSES OF DECODED VIDEO DATA

(75) Inventors: Mallinath Hatti, Bangalore (IN); Lakshmanan Ramakrishnan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1036 days.

(21) Appl. No.: 10/703,332

(22) Filed: Nov. 7, 2003

(65) Prior Publication Data

US 2005/0036553 A1      Feb. 17, 2005

Related U.S. Application Data

(60) Provisional application No. 60/495,301, filed on Aug. 14, 2003, provisional application No. 60/495,695, filed on Aug. 14, 2003.

(51) Int. Cl.
*H04N 11/02*      (2006.01)
*H04N 7/12*       (2006.01)
*H04N 9/77*       (2006.01)
*H04N 5/222*      (2006.01)

(52) U.S. Cl. ............... 375/240.25; 348/714; 348/715; 348/716; 348/717

(58) Field of Classification Search ......... 348/714–719; 375/240.25
See application file for complete search history.

(56) References Cited

U.S. PATENT DOCUMENTS

| | | | | |
|---|---|---|---|---|
| 5,469,228 | A * | 11/1995 | Kim et al. | 348/715 |
| 5,729,303 | A * | 3/1998  | Oku et al. | 348/716 |
| 5,912,676 | A * | 6/1999  | Malladi et al. | 345/531 |
| 6,219,725 | B1 * | 4/2001 | Diehl et al. | 710/26 |
| 6,961,063 | B1 * | 11/2005 | Kuriakin et al. | 345/506 |

* cited by examiner

*Primary Examiner*—Marsha D Banks Harold
*Assistant Examiner*—Chikaodili E Anyikire
(74) *Attorney, Agent, or Firm*—McAndrews, Held & Malloy, Ltd.

(57) ABSTRACT

The present invention is directed to a line address computer for calculating the starting line addresses for lines of a decoded frame. The starting addresses for a display frame are provided to the line address computer by a host processor. The line address computer determines the starting line addresses for subsequent lines by appropriately incrementing the line addresses of previous lines.

7 Claims, 12 Drawing Sheets

FIG. 1

|  |  | 400(0,0) | 400(0,1) |  | 400(1,X) |
|---|---|---|---|---|---|
| 100(0) | TY0 | YYYYYYYYYYYYYYY | YYYYYYYYYYYYYYY | . . . . . . . . . . | .YYYYYYYYYYYYYYY |
| 100(0.5) | TC0 | c c c c c c c | c c c c c c c |  | c c c c c c c |
| 100(1) | BY0 | YYYYYYYYYYYYYYY | YYYYYYYYYYYYYYY | . . . . . . . . . . | .YYYYYYYYYYYYYYY |
| 100(2) | TY1 | YYYYYYYYYYYYYYY | YYYYYYYYYYYYYYY |  | .YYYYYYYYYYYYYYY |
| 100(2.5) | BC0 | c c c c c c c | c c c c c c c |  | c c c c c c c |
| 100(3) | BY1 | YYYYYYYYYYYYYYY | YYYYYYYYYYYYYYY | . . . . . . . . . . | .YYYYYYYYYYYYYYY |
| 100(4) | TY2 | YYYYYYYYYYYYYYY | YYYYYYYYYYYYYYY | . . . . . . . . . . | .YYYYYYYYYYYYYYY |
| 100(4.5) | TC1 | c c c c c c c | c c c c c c c |  | c c c c c c c |
| 100(5) | BY2 | YYYYYYYYYYYYYYY | YYYYYYYYYYYYYYY |  | .YYYYYYYYYYYYYYY |
| 100(6) | TY3 | YYYYYYYYYYYYYYY | YYYYYYYYYYYYYYY | . . . . . . . . . . | .YYYYYYYYYYYYYYY |
| 100(6.5) | BC1 | c c c c c c c | c c c c c c c |  | c c c c c c c |
| 100(7) | BY3 | YYYYYYYYYYYYYYY | YYYYYYYYYYYYYYY | . . . . . . . . . . | .YYYYYYYYYYYYYYY |
| 100(8) | TY4 | YYYYYYYYYYYYYYY | YYYYYYYYYYYYYYY |  | .YYYYYYYYYYYYYYY |
| 100(8.5) | TC2 | c c c c c c c | c c c c c c c |  | c c c c c c c |
| 100(9) | BY4 | YYYYYYYYYYYYYYY | YYYYYYYYYYYYYYY |  | .YYYYYYYYYYYYYYY |
| 100(10) | TY5 | YYYYYYYYYYYYYYY | YYYYYYYYYYYYYYY | . . . . . . . . . . | .YYYYYYYYYYYYYYY |
| 100(11.5) | BC2 | c c c c c c c | c c c c c c c |  | c c c c c c c |
| 100(11) | BY5 | YYYYYYYYYYYYYYY | YYYYYYYYYYYYYYY | . . . . . . . . . . | .YYYYYYYYYYYYYYY |
| 100(12) | TY6 | YYYYYYYYYYYYYYY | YYYYYYYYYYYYYYY |  | .YYYYYYYYYYYYYYY |
| 100(12.5) | TC3 | c c c c c c c | c c c c c c c |  | c c c c c c c |
| 100(13) | BY6 | YYYYYYYYYYYYYYY | YYYYYYYYYYYYYYY | . . . . . . . . . . | .YYYYYYYYYYYYYYY |
| 100(14) | TY7 | YYYYYYYYYYYYYYY | YYYYYYYYYYYYYYY | . . . . . . . . . . | .YYYYYYYYYYYYYYY |
| 100(14.5) | BC3 | c c c c c c c | c c c c c c c |  | c c c c c c c |
| 100(15) | BY7 | YYYYYYYYYYYYYYY | YYYYYYYYYYYYYYY | . . . . . . . . . . | .YYYYYYYYYYYYYYY |
| 100(16) | TY8 | YYYYYYYYYYYYYYY | YYYYYYYYYYYYYYY |  | .YYYYYYYYYYYYYYY |
| 100(16.5) | TC4 | c c c c c c c | c c c c c c c |  | c c c c c c c |
| 100(17) | BY8 | YYYYYYYYYYYYYYY | YYYYYYYYYYYYYYY | . . . . . . . . . . | .YYYYYYYYYYYYYYY |
| 100(18) | TY9 | YYYYYYYYYYYYYYY | YYYYYYYYYYYYYYY | . . . . . . . . . . | .YYYYYYYYYYYYYYY |
| 100(18.5) | BC4 | c c c c c c c | c c c c c c c |  | c c c c c c c |
| 100(19) | BY9 | YYYYYYYYYYYYYYY | YYYYYYYYYYYYYYY |  | .YYYYYYYYYYYYYYY |
| 100(20) | TY10 | YYYYYYYYYYYYYYY | YYYYYYYYYYYYYYY | . . . . . . . . . . | .YYYYYYYYYYYYYYY |
| 100(20.5) | TC5 | c c c c c c c | c c c c c c c |  | c c c c c c c |
| 100(21) | BY10 | YYYYYYYYYYYYYYY | YYYYYYYYYYYYYYY | . . . . . . . . . . | .YYYYYYYYYYYYYYY |
| 100(22) | TY11 | YYYYYYYYYYYYYYY | YYYYYYYYYYYYYYY |  | .YYYYYYYYYYYYYYY |
| 100(22.5) | BC5 | c c c c c c c | c c c c c c c |  | c c c c c c c |
| 100(23) | BY11 | YYYYYYYYYYYYYYY | YYYYYYYYYYYYYYY | . . . . . . . . . . | .YYYYYYYYYYYYYYY |
| 100(24) | TY12 | YYYYYYYYYYYYYYY | YYYYYYYYYYYYYYY | . . . . . . . . . . | .YYYYYYYYYYYYYYY |
| 100(24.5) | TC6 | c c c c c c c | c c c c c c c |  | c c c c c c c |
| 100(25) | BY12 | YYYYYYYYYYYYYYY | YYYYYYYYYYYYYYY |  | .YYYYYYYYYYYYYYY |
| 100(26) | TY13 | YYYYYYYYYYYYYYY | YYYYYYYYYYYYYYY | . . . . . . . . . . | .YYYYYYYYYYYYYYY |
| 100(26.5) | BC6 | c c c c c c c | c c c c c c c |  | c c c c c c c |
| 100(27) | BY13 | YYYYYYYYYYYYYYY | YYYYYYYYYYYYYYY | . . . . . . . . . . | .YYYYYYYYYYYYYYY |
| 100(28) | TY14 | YYYYYYYYYYYYYYY | YYYYYYYYYYYYYYY |  | .YYYYYYYYYYYYYYY |
| 100(28.5) | TC7 | c c c c c c c | c c c c c c c |  | c c c c c c c |
| 100(29) | BY14 | YYYYYYYYYYYYYYY | YYYYYYYYYYYYYYY |  | .YYYYYYYYYYYYYYY |
| 100(30) | TY15 | YYYYYYYYYYYYYYY | YYYYYYYYYYYYYYY | . . . . . . . . . . | .YYYYYYYYYYYYYYY |
| 100(30.5) | BC7 | c c c c c c c | c c c c c c c |  | c c c c c c c |
| 100(31) | BY15 | YYYYYYYYYYYYYYY | YYYYYYYYYYYYYYY | . . . . . . . . . . | .YYYYYYYYYYYYYYY |
| : |  | 400(1,0) | 400(1,1) |  | 400(1,X) |
| 100(n-7) | T | YYYYYYYYYYYYYYY | YYYYYYYYYYYYYYY | . . . . . . . . . . | .YYYYYYYYYYYYYYY |
| 100(n-6.5) |  | c c c c c c c | c c c c c c c |  | c c c c c c c |
| 100(n-6) | B | YYYYYYYYYYYYYYY | YYYYYYYYYYYYYYY |  | .YYYYYYYYYYYYYYY |
| 100(n-5) | T | YYYYYYYYYYYYYYY | YYYYYYYYYYYYYYY | . . . . . . . . . . | .YYYYYYYYYYYYYYY |
| 100(n-4.5) |  | c c c c c c c | c c c c c c c |  | c c c c c c c |
| 100(n-4) | B | YYYYYYYYYYYYYYY | YYYYYYYYYYYYYYY |  | .YYYYYYYYYYYYYYY |
| 100(n-3) | T | YYYYYYYYYYYYYYY | YYYYYYYYYYYYYYY | . . . . . . . . . . | .YYYYYYYYYYYYYYY |
| 100(n-2.5) |  | c c c c c c c | c c c c c c c |  | c c c c c c c |
| 100(n-2) | B | YYYYYYYYYYYYYYY | YYYYYYYYYYYYYYY |  | .YYYYYYYYYYYYYYY |
| 100(n-1) | T | YYYYYYYYYYYYYYY | YYYYYYYYYYYYYYY | . . . . . . . . . . | .YYYYYYYYYYYYYYY |
| 100(n-0.5) |  | c c c c c c c | c c c c c c c |  | c c c c c c c |
| 100(n) | B | YYYYYYYYYYYYYYY | YYYYYYYYYYYYYYY | . . . . . . . . . . | .YYYYYYYYYYYYYYY |

| 400(0,0) | 400(0,1) | ............ | 400(0,x-1) | 400(0,x) |
|---|---|---|---|---|
| 400(1,0) | 400(1,1) | ............ | 400(1,x-1) | 400(1,x) |
| ⋮ | ⋮ | | ⋮ | ⋮ |
| 400(y-1,0) | 400(y-1,1) | ............ | 400(y-1,x-1) | 400(y-1,x) |
| 400(y,0) | 400(y,1) | ............ | 400(y,x-1) | 400(y,x) |

FIGURE 2F

Top Field T

| 400(0,0) | 400(0,1) | ............ | 400(0,x-1) | 400(0,x) |
|---|---|---|---|---|
| 400(1,0) | 400(1,1) | ............ | 400(1,x-1) | 400(1,x) |
| ⋮ | ⋮ | | ⋮ | ⋮ |
| 400(y-1,0) | 400(y-1,1) | ............ | 400(y-1,x-1) | 400(y-1,x) |
| 400(y,0) | 400(y,1) | ............ | 400(y,x-1) | 400(y,x) |

Bottom Field B

| 400(0,0) | 400(0,1) | ............ | 400(0,x-1) | 400(0,x) |
|---|---|---|---|---|
| 400(1,0) | 400(1,1) | ............ | 400(1,x-1) | 400(1,x) |
| ⋮ | ⋮ | | ⋮ | ⋮ |
| 400(y-1,0) | 400(y-1,1) | ............ | 400(y-1,x-1) | 400(y-1,x) |
| 400(y,0) | 400(y,1) | ............ | 400(y,x-1) | 400(y,x) |

| 400Y(0,0) |
| --- |
| 400Y(0,1) |
| : |
| 400Y(0,x) |
| 400Y(1,0) |
| 400Y(1,1) |
| : |
| 400Y(1,x) |
| : |
| : |
| 400Y(y,0) |
| 400Y(y,1) |
| : |
| 400Y(y,x) |

415C            420C(0)

| 400C(0,0) |
| --- |
| 400C(0,1) |
| : |
| 400C(0,x) |
| 400C(1,0) |
| 400C(1,1) |
| : |
| 400C(1,x) |
| : |
| : |
| 400C(y,0) |
| 400C(y,1) |
| : |
| 400C(y,x) |

LINE ADDRESS COMPUTER FOR CALCULATING THE LINE ADDRESSES OF DECODED VIDEO DATA

RELATED APPLICATIONS

This application claims priority to Provisional Application for U.S. Patent, App. Ser. No. 60/495,695, entitled "LINE ADDRESS COMPUTER FOR FACILITATING CHROMA CONVERSION", filed Aug. 14, 2003, by Hatti, which is incorporated herein by reference.

RELATED APPLICATIONS

This application is also related to U.S. Patent Application, Ser. No. 60/495,301, entitled "PIXEL REORDERING LOGIC FOR MULTIPLE FORMATS IN A FEEDER", filed Aug. 14, 2003, by Hatti, et. al., which is incorporated herein by reference. This application is also related to the following U.S. patent applications, each of which are incorporated herein by reference: "Pixel Reordering and Selection Logic", U.S. patent application Ser. No. 10/712,482, filed Nov. 13, 2003 by Hatti, et. al., and claiming priority to Provisional Application for Patent Ser. No. 60/495,301. "Line Address Computer for Providing Coefficients to Chroma Filter", U.S. patent application Ser. No. 10/712,638, filed Nov. 13, 2003 by Hatti, and claiming priority to Provisional Application for Patent Ser. No. 60/495,695. "Line Address Computer for Providing Line Addresses in Multiple Contexts", U.S. patent application Ser. No. 10/714,833, filed Nov. 14, 2003 by Hatti, and claiming priority to Provisional Application for Patent Ser. No. 60/495,695.

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

A video decoder receives encoded video data and decodes and/or decompresses the video data. The decoded video data comprises a series of pictures. A display device displays the pictures. The pictures comprise a two-dimensional grid of pixels. The display device displays the pixels of each picture in real time at a constant rate. In contrast, the rate of decoding can vary considerably for different video data. Accordingly, the video decoder writes the decoded pictures in a frame buffer.

Among other things, a display engine is synchronized with the display device and provides the appropriate pixels to the display device for display. The display engine determines the frame buffer address of the appropriate pixels, in order to provide the appropriate pixels to the display device. The address of the appropriate pixels is dependent on the manner that the video decoder writes the picture to the frame buffer.

Characteristics that characterize the manner that the video decoder writes the picture to the frame buffer include the packing of luma and chroma pixels, the linearity that the picture is stored and the spatial relationship between the luma and chroma pixels. The foregoing characteristics are usually determined by the native format and the encoding format of the source video data.

The luma and chroma pixels of a picture can either be packed together or separately. The chroma pixels include red difference pixel Cr, and blue difference pixel Cb. In Macro block frame format, the luma pixels are packed in one array, while both chroma pixels Cr/Cb are packed together in another array. In planar format, the luma pixels are packed in one array, the Cr pixels are packed in a second array, and the Cb pixels are packed in a third array. In Packed YUV format, the luma pixels and both the chroma Cr/Cb pixels are packed together in a single array.

The video decoder does not necessarily store the picture in a linear manner. In planar and Packed YUV formats, the video decoder stores pictures in left to right and top to bottom order in the memory. However, in MPEG 1,2, and 4, and DV-25_ pictures are stored in the frame buffer in a macroblock format. In the macroblock format, the pixels of the picture are divided into two dimensional blocks. The video decoder stores the two dimensional blocks in consecutive memory locations.

Additionally, the spatial relationship of chroma pixels to luma pixels can differ among the many standards. Standards defining the spatial relationship of the chroma pixels to luma pixels include MPEG 4:2:0, MPEG 4:2:2, DV-25 4:1:1, and DV-25 4:2:0, to name a few. Where the standards for the display and the decoded video data differ, chroma pixels for the display can be interpolated from two or more chroma pixels in the decoded video data. The chroma interpolation—depends on the native format of the source video data.

Conventionally, after each horizontal synchronization pulse, the host processor calculates the address of the first pixels of a line and the parameters for chroma format conversion. The host processor then programs the display engine with the foregoing.

Programming the display engine at each horizontal synchronization pulse consumes considerable bandwidth from the host processor.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein is a line address computer for calculating the line addresses of decoded video data.

In one embodiment, there is presented a decoder system for decoding and displaying video data. The decoder system comprises a frame buffer, a feeder, and a host processor. The frame buffer stores the video data in accordance with a selected one of a plurality of storing formats. The feeder rasterizes the stored video data in accordance with a display format. The host processor provides at least one starting address for a display picture to the feeder. The feeder calculates at least one starting address for one or more lines in the display picture, based on the selected one of the plurality of storing formats.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 2A is a block diagram of an exemplary MPEG-2 or frame formatted in accordance with the 4:2:0 standard;

FIG. 2C is a block diagram describing an exemplary frame with DV25 4:2:0 formatting;

DETAILED DESCRIPTION OF THE INVENTION

Figure 1:
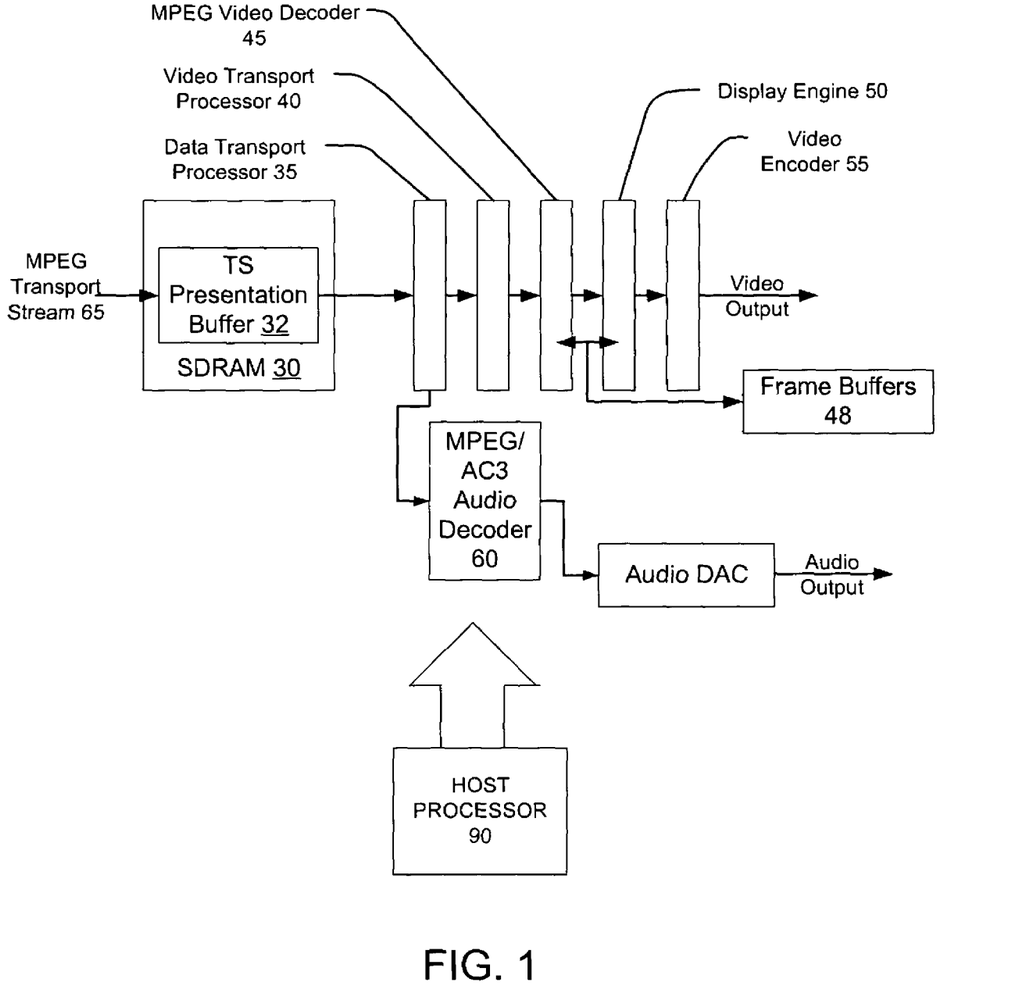
FIG. 1 is a block diagram of an exemplary decoder system for decoding compressed video data, configured in accordance with an embodiment of the present invention.

Referring now to FIG. 1, there is illustrated a block diagram of an exemplary decoder system for decoding compressed video data, configured in accordance with an embodiment of the present invention. A processor, that may include a CPU 90, reads transport stream 65 into a transport stream buffer 32 within a SDRAM 30.

The data is output from the transport stream buffer 32 and is then passed to a data transport processor 35. The data transport processor 35 then demultiplexes the transport stream 65 into constituent transport streams. The constituent packetized elementary stream can include for example, video transport streams, and audio transport streams. The data transport processor 35 passes an audio transport stream to an audio decoder 60 and a video transport stream to a video transport processor 40.

The video transport processor 40 converts the video transport stream into a video elementary stream and provides the video elementary stream to a video decoder 45. The video decoder 45 decodes the video elementary stream, resulting in a sequence of decoded video pictures. The decoding can include decompressing the video elementary stream. It is noted that there are various standards for compressing the amount of data required for transportation and storage of video data, such as MPEG-2. The video decoder 45 decompresses the video data.

The decoded video data includes a series of pictures. The pictures are stored in a frame buffer 48. The frame buffer 48 can be dynamic random access memory (DRAM) comprising 128 bit/16 byte gigantic words (gwords). It is also noted that in certain standards, such as MPEG-2, the order that pictures are decoded is not necessarily the order that pictures are presented. Accordingly, several pictures can be stored in the frame buffer 48 at a given time.

A display engine 50 is responsible for and operable to select a frame (or field) for display at every vertical synchronization pulse, scale the picture, render the graphics, construct the complete display, and rasterize the picture, among other functions. The rasterized picture is passed to a video encoder 55 where it is converted to analog video using an internal digital to analog converter (DAC). The digital audio is converted to analog in the audio digital to analog converter (DAC) 65.

Characteristics that characterize the format that the video decoder writes the picture to the frame buffer include the spatial relationship between the luma pixels and the chroma pixels, the packing of luma and chroma pixels, the linearity that the picture is stored and the spatial relationship between the luma and chroma pixels are factors. The foregoing characteristics are usually determined by the native format and the encoding format of the source video data.

The different characteristics of different standards result in pixels of pictures being stored in different orders. Accordingly, different schemes are used for different standards to determine the addresses of pixels in raster scan order. Additionally, where the spatial relationship between chroma and luma pixels of the native format and the display format differ, the chroma pixels from the native format are converted to the display format. The embodiments presented herein will be described for MPEG 4:2:2 as the display format, although other embodiments may use other display formats.

Referring now to FIG. 2A, there is illustrated a block diagram of an exemplary MPEG 2, or 4 frame 100 formatted in accordance with the 4:2:0 standard. The frame 100 comprises any number of lines 100(0), 100(0.5), 100(1), 100(2), 100(2.5), 100(3) . . . 100(n) of pixels. Each line 100(0), 100(1), 100(2) . . . 100 (n)/Y0, Y1, . . . YN is occupied by a row of luma pixels Y. Each line 100(0.5), 100(2.5), . . . 100(n–0.5)/C0, C1, . . . C(N–1)/2 is occupied by chroma pixels. Every other pixel Y is adjacent to chroma pixels by a half pixel row.

The picture 100 can either be a progressive picture or an interlaced picture. Where the picture 100 is a progressive picture, the lines are displayed sequentially from top to bottom, e.g., Y0, C0, Y1, Y2, C1, . . . YN. Where the picture is an interlaced picture 100, the top field comprising the even-numbered luma lines Y0, Y2, . . . YN–1, and the even-numbered chroma lines C0, C2, . . . CN–3/2 are displayed first, followed by the bottom field comprising the odd-numbered luma lines, Y1, Y3, . . . YN, and chroma lines C1, C3, . . . CN–1/2. The luma Y and chroma C lines are renumbered in the right-hand column, indicating the order of display in the top field (indicated by a T), and the bottom field (indicated by a B).

The pixels are divided into macroblocks 400 comprising 16×16 blocks of luma pixels Y and 8×8 chroma pixels C. In a progressive picture, the macroblocks 400 comprise consecutive lines. However, in interlaced pictures, the macroblocks 400 comprise blocks from the top field and blocks from the bottom field. Accordingly, a macroblock 400 in an interlaced picture comprises alternating luma and chroma lines. The macroblocks for progressive pictures are indicated by rectangles. A macroblock 400(0,0) for an interlaced picture is indicated by boldface type.

Figure 2B:
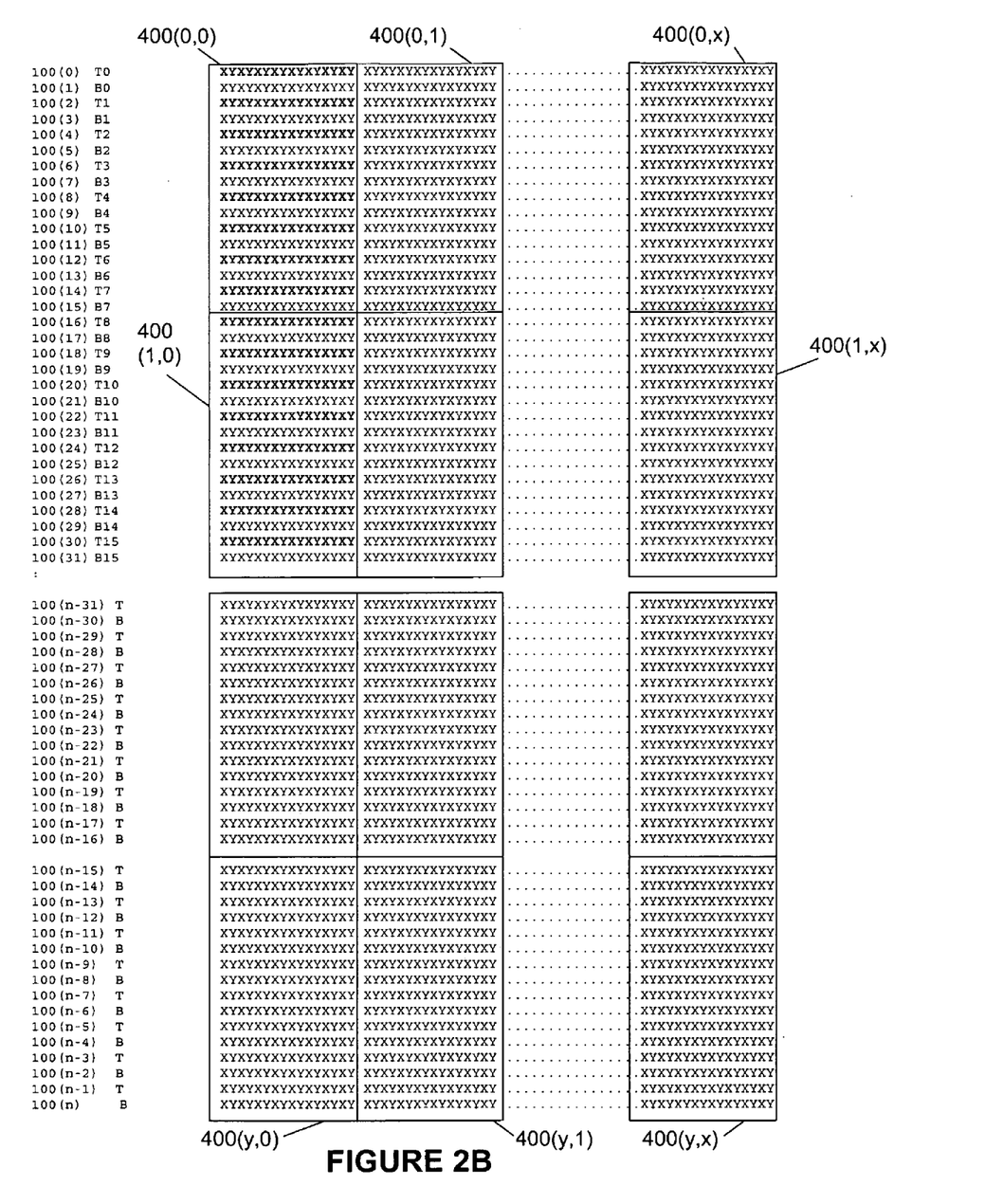
FIG. 2B is a block diagram describing an exemplary frame with MPEG 1,2,4 4:2:2 formatting.

Referring now to FIG. 2B, there is illustrated a block diagram describing an exemplary frame 100 with MPEG 2,4 4:2:2 formatting. The frame 100 comprises any number of lines 100(0) . . . 100(n). Each line 100(0) . . . 100(N) includes a row of luma Y pixels Y0 . . . YN and a row of half as many chroma pixels C0 . . . CN. Every other luma pixel is co-located with a chroma pixel (indicated by an X).

The picture 100 can either be a progressive picture 100 or an interlaced picture 100. Where the picture 100 is a progressive picture 100, the lines are displayed sequentially from top to bottom, e.g., 100(0) . . . 100(N). Where the picture is an interlaced picture 100, the top field comprising the even numbered luma and chroma lines 100(0), 100(2), . . . 100(N−1) are displayed first, followed by the bottom field comprising the odd-numbered luma and chroma lines 100(1), 100(3), . . . 100(N). The luma and chroma lines are renumbered in the right-hand column, indicating the order of display in the top field (indicated by a T), and the bottom field (indicated by a B).

The pixels are divided into macroblocks 400 comprising 16×16 luma pixels, and the co-located chroma pixels. In a progressive picture, the macroblocks 400 comprise consecutive lines. However, in interlaced pictures, the macroblocks 400 comprise 16×16 luma blocks and the co-located chroma pixels from either the top field or bottom field. Accordingly, a macroblock 400 in an interlaced picture comprises 16 alternating lines 100(i), 100(i+2) . . . 100(i+4) of 16 luma pixels and 8 chroma pixels. The macroblocks 400 for a progressive picture are indicated by a rectangle. The macroblock 400(0,0) for an interlaced picture is indicated by boldface letters.

Referring now to FIG. 2C, there is illustrated a block diagram describing DV25 4:2:0. The picture comprises any number of lines 100(0) . . . 100(n) of luma pixels Y. Every other luminance pixel Y in the horizontal direction is co-located with a chroma pixel, either Cr or Cb. In the first and second lines of the frame 100(0), 100(1), each alternate luminance pixel Y in the horizontal direction is co-located with a Cr pixel (indicated by an R). In the third and fourth lines of the frame 100(2), 100(3), each alternate luminance pixel Y in the horizontal direction is co-located with a Cb pixel (indicated by a B). The foregoing pattern is repeated for each line in the frame. Accordingly, in lines 100(4i), 100(4i+1) (where i is an integer), each alternating luminance pixel in the horizontal direction is co-located with a Cr pixel. In lines 100(4i+2), 100(4i+3) (where i is an integer), each alternating luminance pixel in the horizontal direction is co-located with a Cb pixel.

The picture 100 can either be a progressive picture 100 or an interlaced picture 100. Where the picture 100 is a progressive picture 100, the lines are displayed from sequentially from top to bottom. Where the picture is an interlaced picture 100, the top field comprising the even numbered luma and chroma lines are displayed first, followed by the bottom field comprising the odd-numbered luma and chroma lines. The luma and chroma lines are renumbered in the right-hand column, indicating the order of display in the top field (indicated by a T), and the bottom field (indicated by a B).

The pixels are divided into macroblocks 400 comprising 16×16 luma pixels, and the co-located chroma pixels. In a progressive picture, the macroblocks 400 comprise consecutive lines. However, in interlaced pictures, the macroblocks 400 comprise 16×16 luma blocks and the co-located chroma pixels from either the top field or bottom field. Accordingly, a macroblock 400 in an interlaced picture comprises 16 alternating lines of 16 luma pixels and 8 chroma pixels. The macroblocks 400 for a progressive picture are indicated by a rectangle. The rows of macroblock 400(0,0) for an interlaced picture is indicated by boldface letters.

Figure 2D:
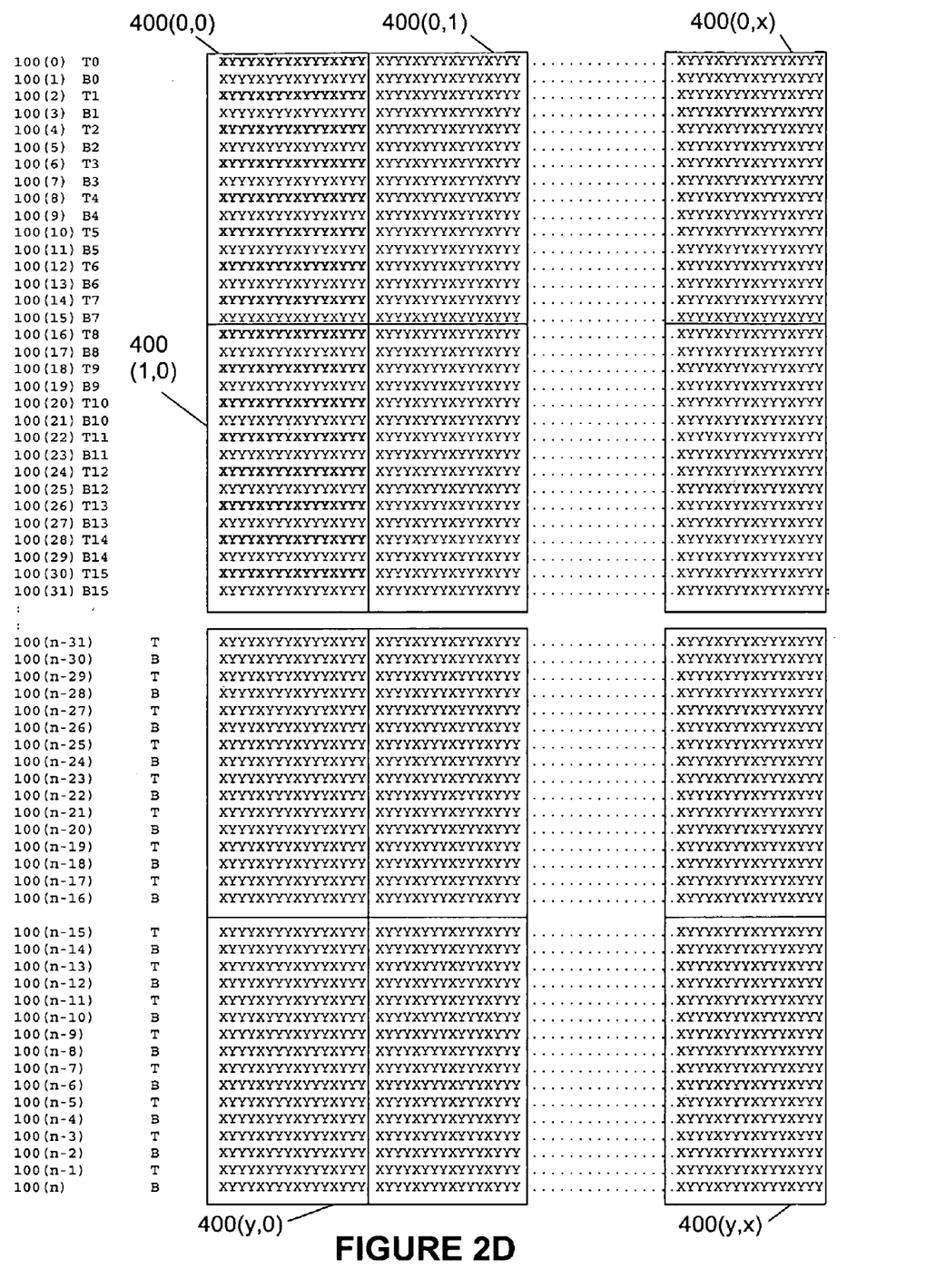
FIG. 2D is a block diagram describing an exemplary frame with DV25 4:1:1 formatting.

Referring now to FIG. 2D, there is illustrated a block diagram describing DV25 4:1:1. The frame comprises any number of lines 100(0) . . . 100(n) of luma pixels Y. Every fourth luminance pixel Y in the horizontal direction is co-located with chroma pixels C (indicated by an X).

The picture 100 can either be a progressive picture 100 or an interlaced picture 100. Where the picture 100 is a progressive picture 100, the lines are displayed from sequentially from top to bottom, e.g., 100(0) . . . 100(N). Where the picture is an interlaced picture 100, the top field comprising the even numbered luma and chroma lines 100(0), 100(2), 100(4), 100(6) . . . are displayed first, followed by the bottom field comprising the odd-numbered luma and chroma lines 100(1), 100(3), 100(5), 100(7), . . . . The luma and chroma lines are renumbered in the right-hand column, indicating the order of display in the top field (indicated by a T), and the bottom field (indicated by a B).

The pixels are divided into macroblocks 400 comprising 16×16 luma pixels, and the co-located chroma pixels. In a progressive picture, the macroblocks 400 comprise consecutive lines. However, in interlaced pictures, the macroblocks 400 comprise 16×16 luma blocks and the co-located chroma pixels from either the top field or bottom field. Accordingly, a macroblock 400 in an interlaced picture comprises 16 alternating lines of 16 luma pixels and 8 chroma pixels. The macroblocks 400 for a progressive picture are indicated by a rectangle. The macroblock 400(0,0) for an interlaced picture is indicated by boldface letters.

Figure 2E:
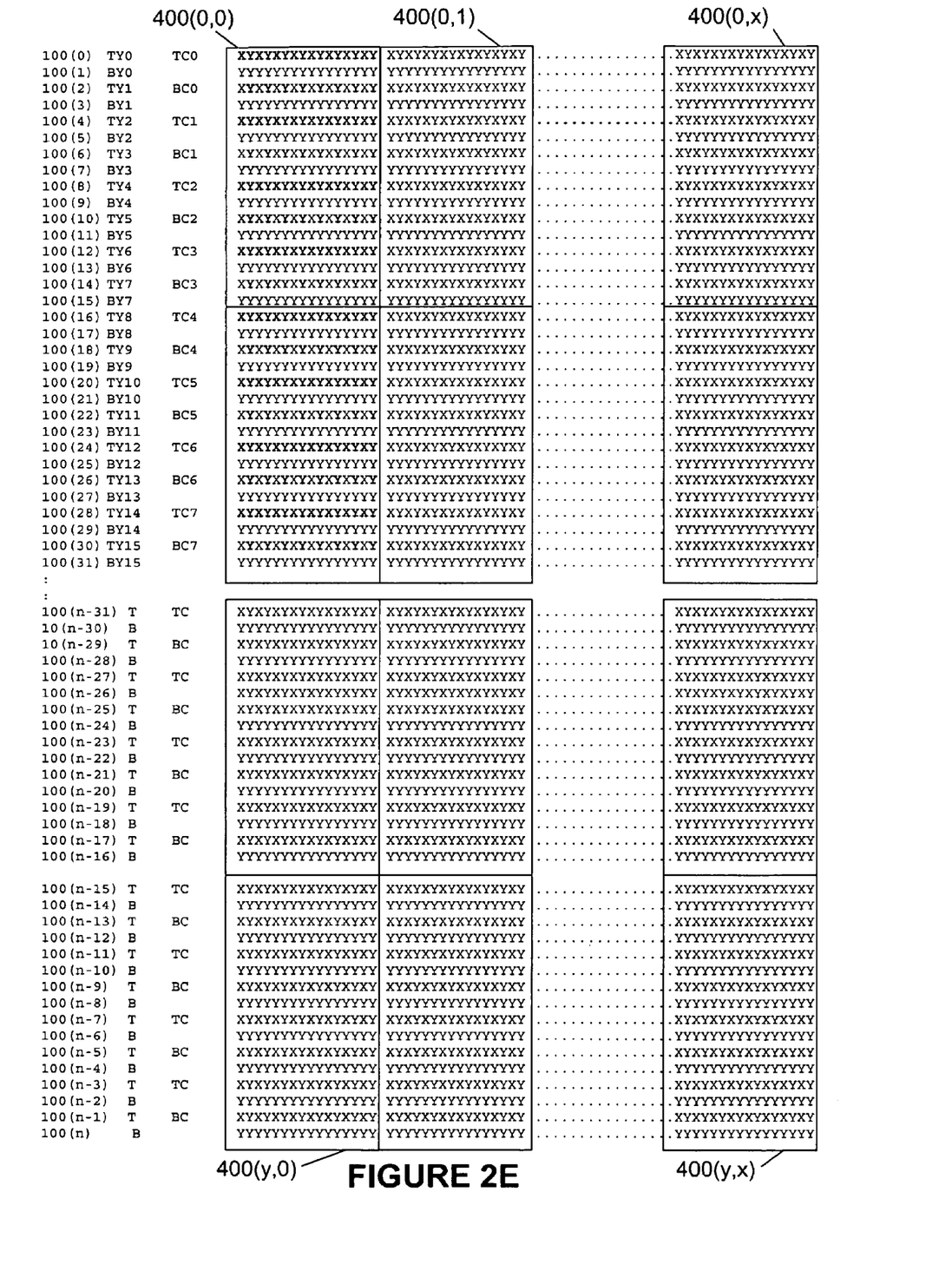
FIG. 2E is a block diagram describing an exemplary frame with TM5 4:2:0 formatting.

Referring now to FIG. 2E, there is illustrated a block diagram describing TM5 4:2:0. The frame 100 comprises any number of lines 100(0) . . . 100(N). Each line 100(0) . . . 100(N) includes a row of luma Y pixels Y0 . . . YN. Every other line 100(0), 100(2), . . . 100(N−1) includes a row of half as many chroma C pixels that are co-located with alternating luma pixels Y (indicated by an X).

The picture 100 can either be a progressive picture or an interlaced picture. Where the picture 100 is a progressive picture, the lines are displayed sequentially from top to bottom, e.g., 100(0) . . . 100(N). Where the picture is an interlaced picture, the top field comprising the even-numbered luma and chroma lines, followed by the bottom field comprising the odd-numbered luma and chroma lines.

The luma Y and chroma C lines are renumbered in the right-hand column indicating the order of display in the top field (indicated by a T) and the bottom field (indicated by a B).

The pixels are divided into macroblocks 400 comprising 16×16 luma pixels, and the co-located chroma pixels. In a progressive picture, the macroblocks 400 comprise consecutive lines. However, in interlaced pictures, the macroblocks 400 comprise 16×16 luma blocks and the co-located chroma pixels from either the top field or bottom field. Accordingly, a macroblock 400 in an interlaced picture comprises 16 alternating lines of 16 luma pixels and 8 chroma pixels. The macroblocks 400 for a progressive picture are indicated by a rectangle. The rows of a macroblock 400(0,0) for an interlaced picture is indicated by boldface letters.

Figure 2F:
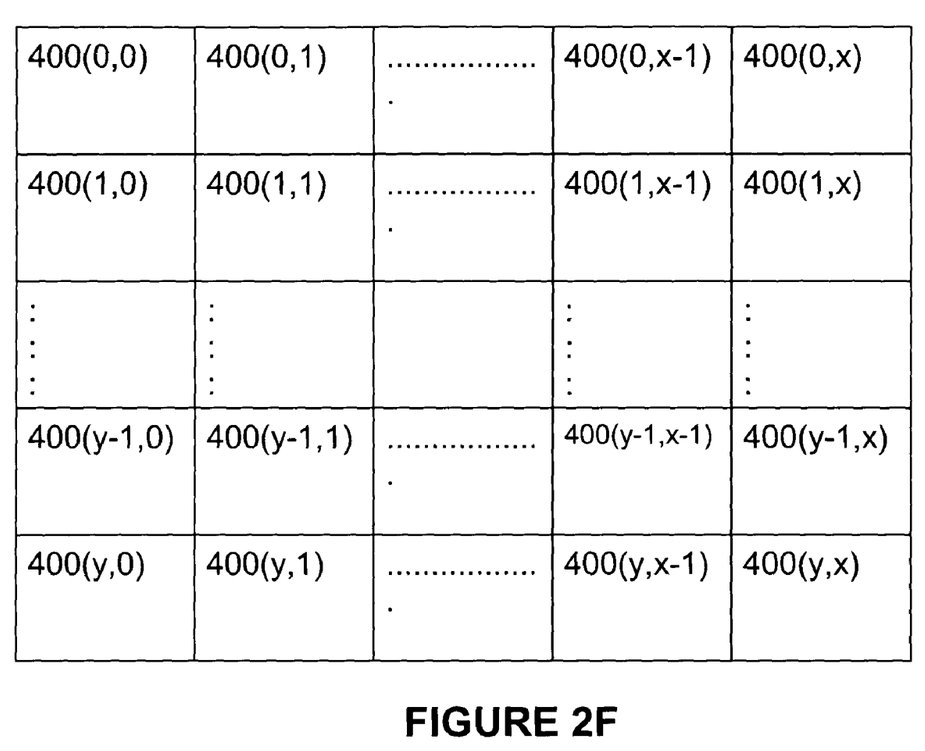
FIG. 2F is a block diagram mapping macroblocks to a progressive picture.

Referring now to FIG. 2F, there is illustrated a block diagram mapping the macroblocks 400 to a progressive picture 100. The picture 100 is associated with a two-dimensional array of macroblocks 400(0,0), 400(0,1), . . . 400(0, x), 400(1,0), 400(1,1), . . . 400(1,x), . . . , 400(y,0), 400(y,1), . . . 400(y,x). Each macroblock 400 represents a particular 16×16 pixel block of the picture 100. The number of macroblocks in the horizontal direction NMBX is the number of (horizontal luma Y pixels+15)/16. The number of macroblocks in the vertical direction NMBY is ((number of luma Y lines+31)/32)*2.

Figure 2G:
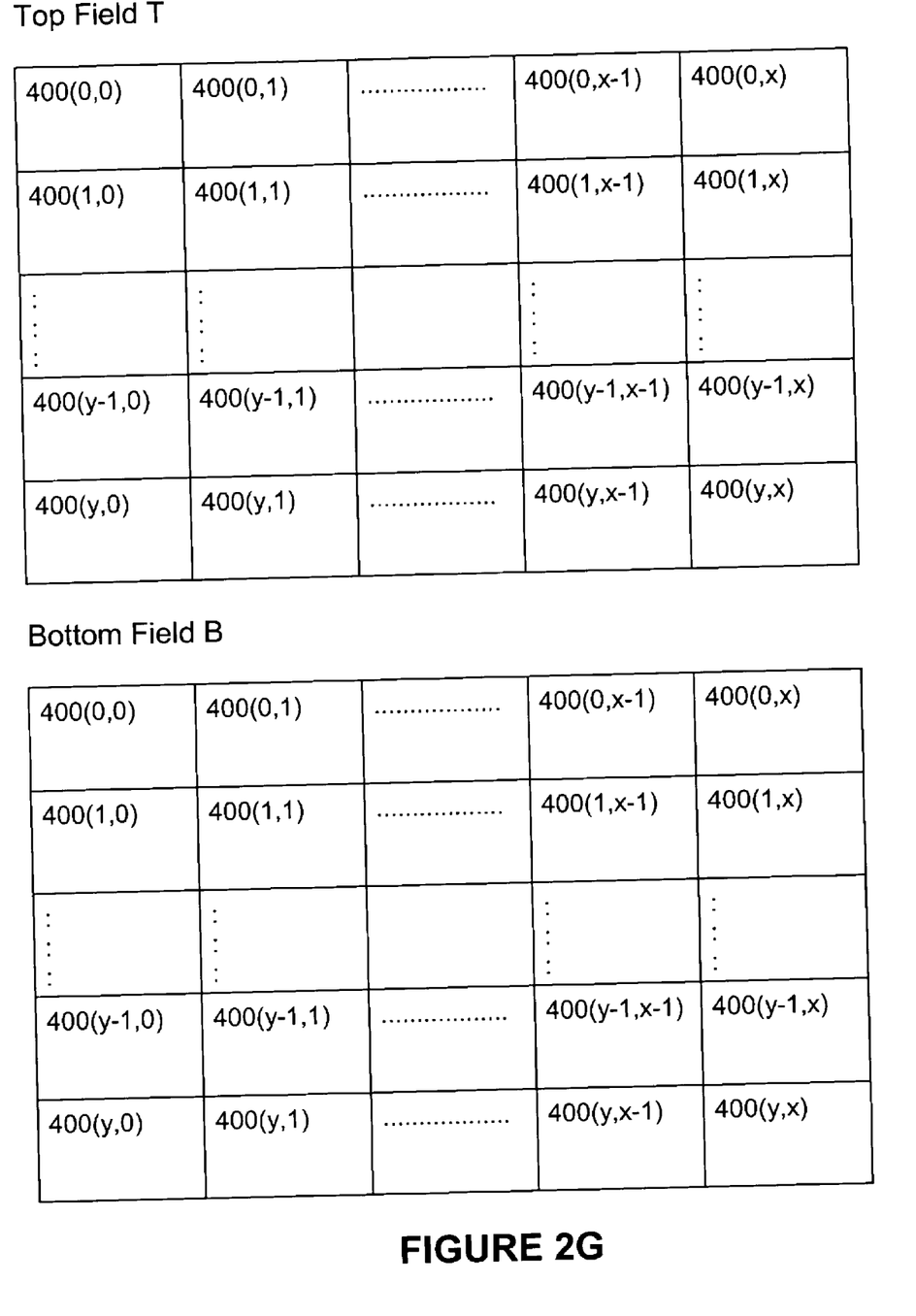
FIG. 2G is a block diagram mapping macroblocks to an interlaced picture.

Referring now to FIG. 2G, there is illustrated a block diagram mapping the macroblocks 400 to an interlaced picture 100. The frame 100 has a top field T comprising the even-numbered luma rows, Y0, Y2, Y4, . . . and even numbered chroma rows, C0, C2, C4, . . . and a bottom field comprising the odd-numbered luma rows Y1, Y3, Y5, . . . , and odd-numbered chroma rows C1, C3, C5, . . . . Each field 100 is associated with a two-dimensional array of macroblocks 400(0,0), 400(0,1), . . . 400(0,x), 400(1,0), 400(1,1), . . . 400(1,x), . . . , 4 00(y,0), 400(y,1), . . . 400(y,x). Each macroblock 400 represents a particular 16×16 pixel block of the field. The number of macroblocks in the horizontal direction NMBX is the number of (horizontal luma Y pixels+15)/16. The number of macroblocks in the vertical direction NMBY is ((number of luma Y lines+31)/32)*2.

Figure 2H:
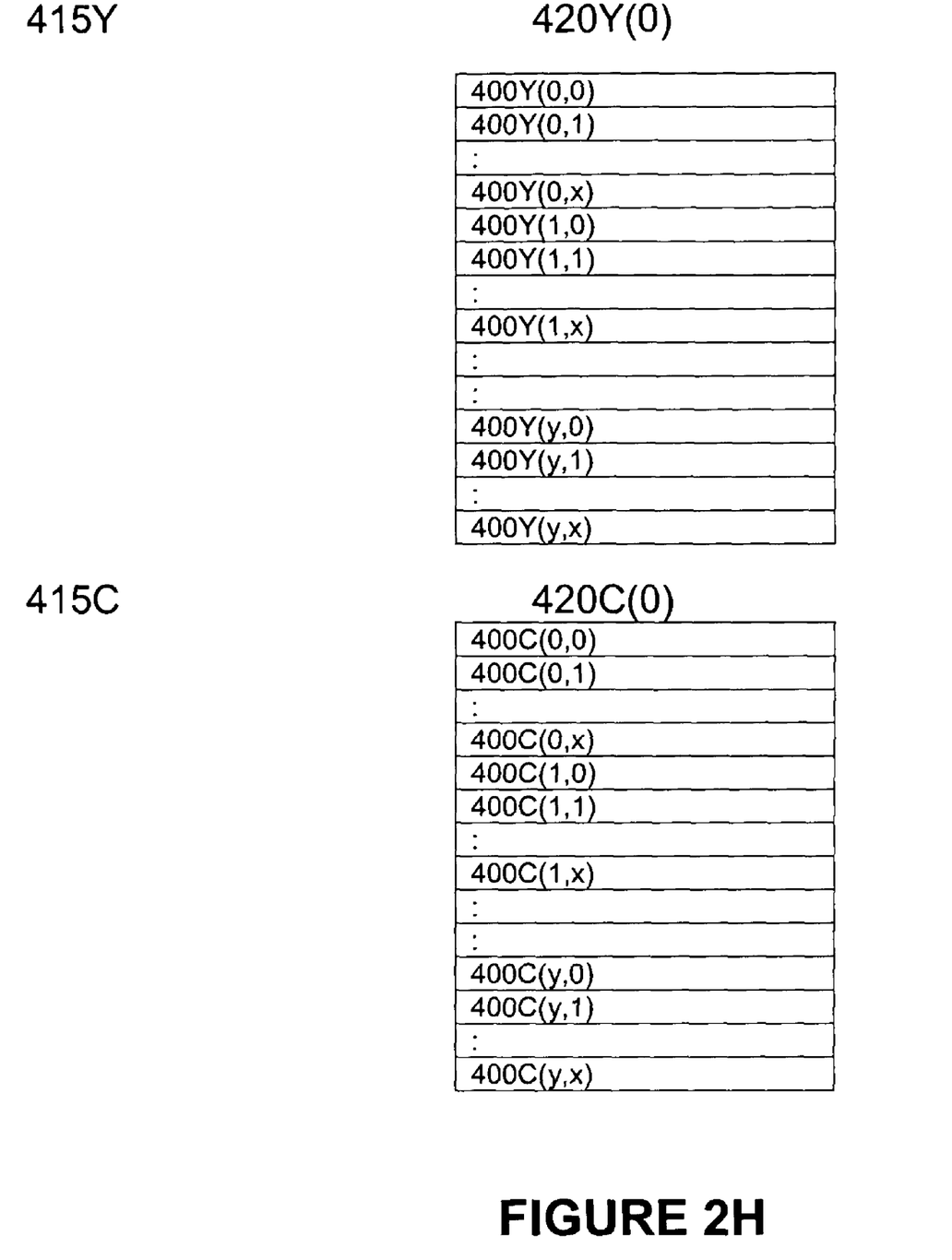
FIG. 2H is a block diagram describing the storage of a decoded MPEG, DV25, or TM5 formatted progressive picture or a single field of an interlaced picture.

Referring now to FIG. 2H, there is illustrated a block diagram describing the storage of a decoded MPEG, DV25, or TM5 formatted progressive picture or a single field of an interlaced picture. The video decoder 45 decodes the pictures 100 on a macroblock 400 by macroblock basis. As each macroblock 400 is decoded, the macroblock 400 is stored sequentially in a frame buffer. The frame buffer comprises two arrays 415Y, 415C of 16 byte/128 bit gwords 420Y(0)...420Y(n), 420C(0)...420C(n). The macroblocks 400 comprise blocks of luma pixels Y and chroma pixels C.

When the video decoder 45 decodes a macroblock 400, the video decoder 45 stores the luma portion in array 415Y and stores the chroma portion in array 415C. The video decoder 45 starts by storing the luma and chroma portions macroblock 400(0,0) in words 420Y(0), and 420C(0), respectively, and continues storing the luma and chroma portions macroblocks 400(0,1), . . . 400(0,x), 400(1,0), . . . 400(1,x), . . . 400(y,0), . . . 400(y,x) in subsequent words.

The starting address for the frame is gwords 420Y(0), and 420C(0). However, reading the array 415Y sequentially from 420Y(0) provides the luma pixels starting from the first row of macroblock 400(0,0). The order proceeds to the second through $16^{th}$ row of macroblock 400(0,0). The pixels then start from the first row of macroblock 400(0,1), and proceed to the second through $16^{th}$ row. The order is repeated for each macroblock 400(0,2)...400(0,x). After the last luma pixel of macroblock 400(0,x), the order proceeds to the first row of macroblock 400(1,0). The ordering is similar for the chroma array 415C.

This order is different from the raster scan order for displaying pixels. For example, although the first row of macroblocks 400(0,0) and 400(0,1) are adjacent in the raster scan order, the memory locations are not adjacent. Instead, the memory locations are 16 gwords apart.

Additionally, it is noted that the starting address for the luma lines in the first macroblock row 400(0,0) . . . 400(0,x) occupy the first byte of consecutive gwords, e.g., 420Y(0), 420Y(1), . . . 420Y(15). Accordingly, a next line luma start address can be determined by incrementing a current line luma start address by 16 bytes, except where the current line is the last line of the macroblock row, i.e., line 15. Where the current line is the last line of the macroblock row, the luma start address for the next line is the starting address for macroblock 400(1,0). Macroblock 400(1,0) comes immediately after the first macroblock row, macroblocks 400(0,0), . . . 400(0,x). The starting address for the next line is determined incrementing the starting address of the current line by a row stride equal to:

(NMBX−1)*MMB+MML where MMB=the amount of memory required to store a macroblock

Figure 3A:
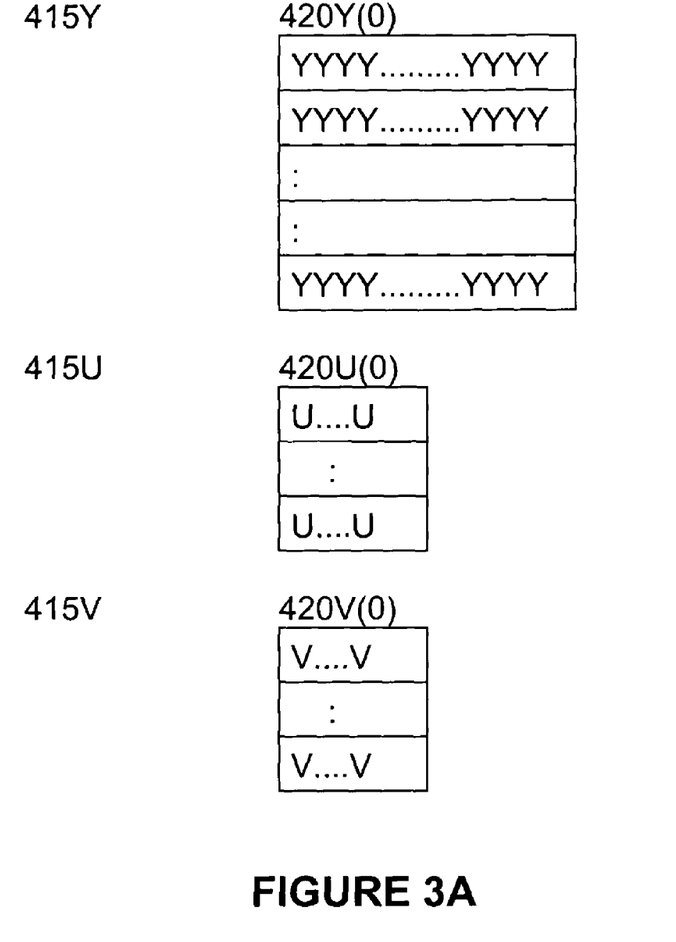
FIG. 3A is a block diagram describing the storage of a frame in accordance with the planar 4:2:2 format.

MML=the amount of memory required to store a macroblock line for progressive display and 2 macroblock lines for interlaced display Referring now to FIG. 3A, there is illustrated a block diagram describing the storage of a frame 100 in accordance with the planar 4:2:2 format. By convention, U represents chroma Cb, and V represents chroma Cr, in YUV notation. The chroma to luma pixel relationship is very similar to the MPEG 4:2:2 format. However, the luma pixels are stored in raster order in one array 415Y of the frame buffer, the chroma U are stored in raster order in another array 415U, and the chroma V are stored in raster order in a third array 415V.

Figure 3B:
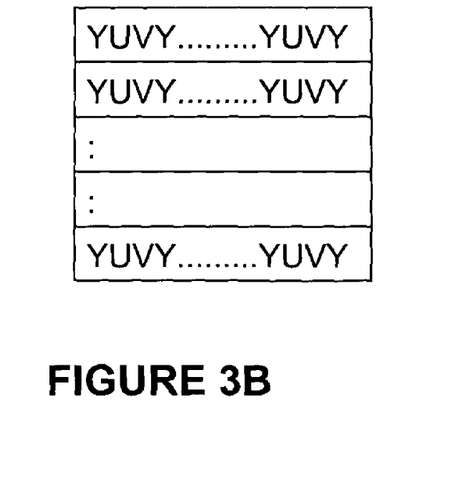
FIG. 3B is a block diagram describing the storage of a frame in accordance with the packed YUV 4:2:2 format.

Referring now to FIG. 3B, there is illustrated a block diagram describing the storage of a frame 100 in accordance with the packed YUV 4:2:2 format. By convention, U represents chroma Cb, and V represents chroma Cr, in YUV notation. The chroma to luma pixel relationship is very similar to the MPEG 4:2:2 format. However, the luma pixels, chroma Cb, and chroma Cr are packed together in a single array. Co-located luma, chroma Cb, and chroma Cr pixels are stored adjacently. The pixels are stored in raster order in one array 415 of the frame buffer.

As can be seen, the order that the frames are stored varies from standard to standard. As a result, different schemes are used for determining the addresses and accessing the pixels in raster scan order. Additionally, different schemes are used for converting the chroma format for the native format to the chroma format of the display format.

Figure 4:
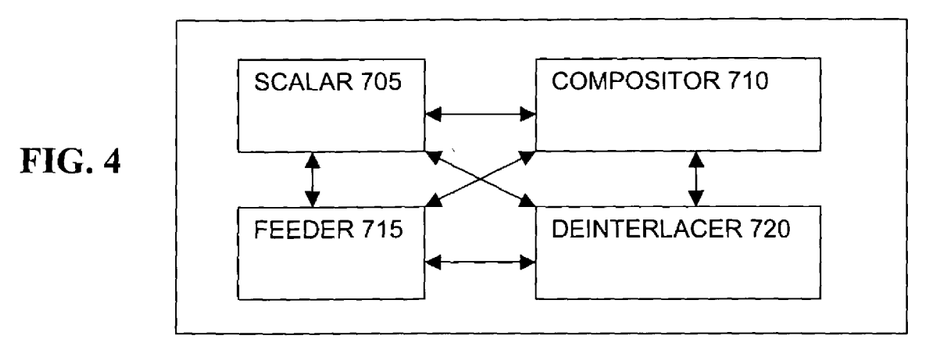
FIG. 4 is a block diagram of the display engine in accordance with an embodiment of the present invention.

Referring now to FIG. 4, there is illustrated a block diagram of the display engine 50 in accordance with an embodiment of the present invention. The display engine 50 includes a scalar 705, a compositor 710, a feeder 715, and a deinterlacing filter 720. The feeder 715 rasterizes the pixels of the displayed picture and converts the format of the picture to the display format.

Figure 5:
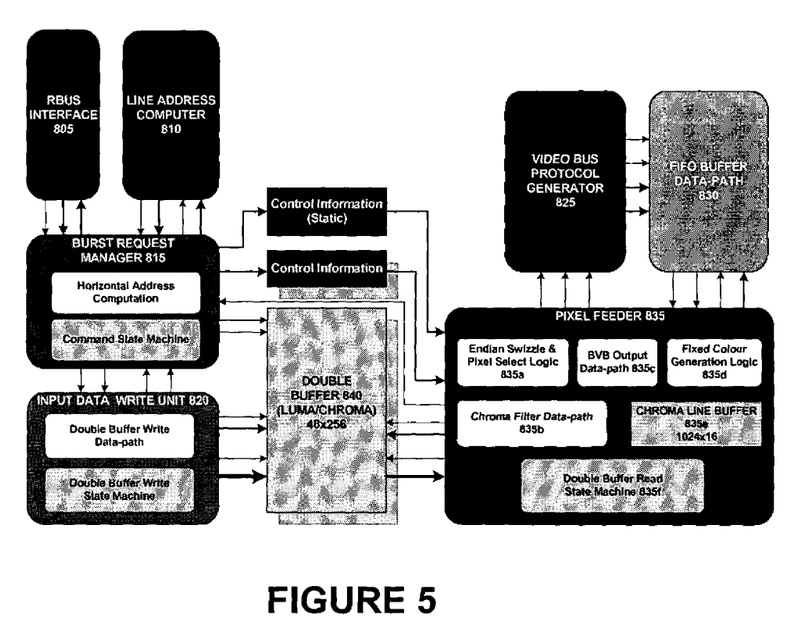
FIG. 5 is a block diagram of the feeder in accordance with an embodiment of the present invention.

Referring now to FIG. 5, there is illustrated a block diagram of the feeder 715 in accordance with an embodiment of the present invention. The feeder 715 comprises an RBUS interface 805, a line address computer (LAC) 810, a Burst Request Manager (BRM) 815, an input data write unit (IDWU) 820, a buffer 840, a pixel feeder 835, a BVB protocol generator 825, and an output buffer 830.

The host processor 90 programs the feeder 715 at the start of the display of each frame or field, with the starting address of the chroma and luma pixels, the line stride, the row stride, and information relating to the mode of the feeder. The foregoing parameters are provided to the feeder 715 via the RBUS interface 805. After providing the parameters to the RBUS interface 805, the host 90 sets a start parameter in the RBUS interface 805.

The feeder 715 fetches each pixel line in a series of bursts and stores the pixels in the buffer 840. The initial starting luma and chroma addresses are provided to the BRM 815. When the BRM 815 receives the starting luma and chroma addresses, the start parameter in the RBUS Interface 805 is deasserted.

The BRM 815 issues the commands for fetching the luma and chroma pixels in the first line of the frame/field. The IDWU 820 effectuates the commands. The pixel feeder 835 retrieves the luma Y and chroma C pixels from the buffer 840, and outputs a rasterized stream formatted in accordance with the display format. The output rasterized stream is provided to the output buffer, via the BVB protocol generator.

After the BRM 815 receives the initial luma and chroma starting address of the frame, the LAC 810 detects deassertion of the start parameter and calculates the starting address of the next line and stores the addresses in the RBUS Interface 805 and reasserts the start parameter. The starting luma and chroma addresses of the next line are determined by appropriately incrementing the starting address of the current line. When the BRM 815 and IDWU 820 finish transferring the current line to the buffer 840, the BRM 815 receives the starting addresses for the next line from the RBUS Interface 805. When the BRM 815 receives the starting addresses for the next line, the start parameter is deasserted. The foregoing process is repeated until the end of the picture.

The computation of the line addresses for the chroma and luma lines is shown in the table below.

| Image Format: (MPEG/ TM5/DV25/ Packed) | Chroma Type: (4:2:0/ 4:2:2/ 4:1:1) | Display Type: (Progressive/ Interlaced) | Luma Line Address Bit[7:4] | Luma Line Address Computation Description | Chroma Line Address Bit[7:4] | Chroma Line Address Computation Description |
|---|---|---|---|---|---|---|
| MPEG1/ MPEG2/ MPEG4/ TM5/ DV25 | 4:2:0/ 4:2:2/ 4:1:1 | Progressive | 0 to E | Luma_Addr <= Luma_Addr + MPEG_Luma_Line_Stride; | 0 to E | Chroma_Addr <= Chroma_Addr + MPEG_Chroma_Line_Stride; |
| | | | F | Luma_Addr <= Luma_Addr + Row_Stride; | F | Chroma_Addr <= Chroma_Addr + Row_Stride; |
| | | Interlaced | 0 to D | Luma_Addr <= Luma_Addr + MPEG_Luma_Line_Stride; | 0 to D | Chroma_Addr <= Chroma_Addr + MPEG_Chroma_Line_Stride; |
| | | | E or F | Luma_Addr <= Luma_Addr + Row_Stride; | E or F | Chroma_Addr <= Chroma_Addr + Row_Stride; |
| PACKED | 4:2:2 | Progressive/ Interlaced | - Unused - | Line_Addr <= Line_Addr + Packed_Line_Stride; | - Unused - | - NA - |

Note:
The Line start addresses (Luma/Chroma) are in terms of byte addresses for all image formats. Hence, the line address increments (Luma line stride, Chroma line stride and Row stride) are also in terms of bytes.

Example: For HD Image (1920×1080),

MPEG1/MPEG2/MPEG4/TM5/DV25:

NMBX=Number of macro-blocks in horizontal direction
1. Source Type=Frame, Display Type=Progressive, Chroma Type=4:2:0 and NMBX=120, then MPEG_Luma_Line_Stride=16; MPEG_Chroma_Line_Stride=16; Row_Stride=(((120*32)−30)*8)=30480.
2. Source Type=Frame, Display Type=Interlaced, Chroma Type=4:2:0 and NMBX=120, then MPEG_Luma_Line_Stride=16*2=32; MPEG_Chroma_Line_Stride=16; Row_Stride=(((120*32)−30)*8)=30480.
3. Source Type=Field, Display Type=Interfaced, Chroma Type=4:2:0 and NMBX=120, then MPEG_Luma_Line_Stride=16*2=32; MPEG_Chroma_Line_Stride=16*2=32; Row_Stride=(((120*32)−28)*8)=30496.
4. Source Type=Frame, Display Type=Progressive, Chroma Type=4:2:2/4:1:1 and NMBX=120, then MPEG_Luma_Line_Stride=16; MPEG_Chroma_Line_Stride=16; Row_Stride=(((120*32)−30)*8)=30480.
5. Source Type=Frame, Display Type=Interlaced, Chroma Type=4:2:2/4:1:1 and NMBX=120, then MPEG_Luma_Line_Stride=16*2=32; MPEG_Chroma_Line_Stride 16*2=32; Row_Stride=(((120*32)−28)*8)=
6. Source Type=Field, Display Type=Interfaced, ChromaType=4:2:2/4:1:1 and NMBX=120, then MPEG_Luma_Line_Stride=16*2=32; MPEG_Chroma_Line_Stride=16*2=32; Row_Stride=(((120*32)−28)*8)=30496.

Example: For SD Image (720×480),

Packed:
1. Source Type=Frame and Display Type=Progressive, then Packed_Line_Stride=720*2=1440.
2. Source Type=Frame and Display Type=Interlaced, then Packed_Line_Stride=720*4=2880.
3. Source Type=Field and Display Type=Interlaced, then Packed_Line_Stride=720*4=2880.

Figure 6:
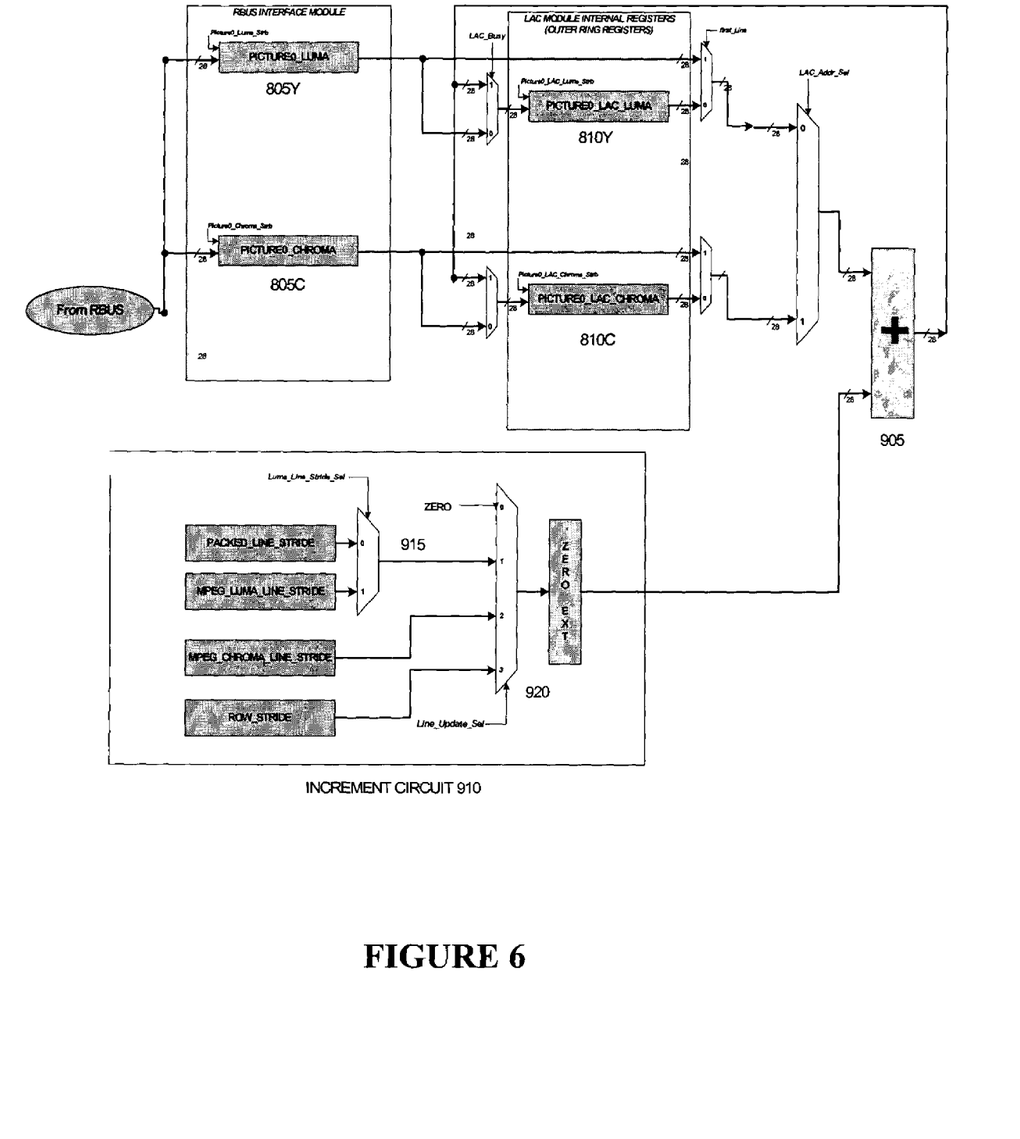
FIG. 6 is a block diagram describing the line computer datapath in accordance with an embodiment present invention.

Referring now to FIG. 6, there is illustrated a block diagram describing the line address computer datapath in accordance with an embodiment of the present invention. At each Vsynch, the host 90 provides the starting addresses of the frame 100 to be displayed to the RBUS Interface 805. The starting addresses include the starting address for the luma Y and chroma pixels Cr/Cb. The starting addresses are stored in luma start register 805Y and chroma start register 805C at the RBUS Interface Module 805.

The LAC 810 includes a present luma address register 810Y and a present chroma address register 810C. The starting address for a new line 100(x+1) is calculated from the starting address of a previous line 100(x) (or the starting address of the frame) by adding an increment via an adder 905. The adder 905 receives the starting addresses of the current luma and chroma lines from the present luma address register 810Y and a present chroma address register 810C and an increment from an increment circuit 910.

The increment circuit 910 receives an MPEG luma line stride, an MPEG chroma line stride, a row stride, and a packed line stride. The increment circuit 910 selects the appropriate increment based upon a signal provided to multiplexers 915, 920 therein. The signal luma line stride select selects between the MPEG luma line stride and the packed line stride, based on whether the source video format. If the source video format is packed YUV format, the luma line stride select causes multiplexer 915 to select the packed line stride. Otherwise, the luma line stride select causes multiplexer 915 to select the MPEG luma line stride. The second multiplexer 920 receives the output of the first multiplexer 915, the MPEG chroma line stride, the row stride, and 0. The second MUX selects one of the foregoing on the basis of a line update select signal.

Appropriate logic can control the line update select signal to effectuate the computations described in the table above.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A decoder system for decoding and displaying video data, said decoder system comprising:
　a frame buffer for storing the video data in accordance with a selected one of a plurality of storing formats;
　a feeder for rasterizing the stored video data in accordance with a display format;
　a host processor for providing at least one starting address for a display frame to the feeder; and
　the feeder calculates at least one starting address for one or more lines in the display frame, based on the selected one of the plurality of storing formats, the feeder further comprising:
　　at least one register for storing the at least one starting address for the current line;
　　a circuit for selecting an increment from a plurality of increments, wherein the circuit selects the increment based on the selected one of the plurality of storing formats that the video data is stored; and
　　an adder for adding the increment to the at least one starting address for the current line; and
　wherein the circuit for selecting an increment further comprises:
　　a first memory for storing a packed line stride;
　　a second memory for storing a row stride; and
　　at least a third memory for storing at least one line stride for a macroblock storage format.

2. The decoder system of claim 1, wherein the plurality of formats comprise a macroblock format, and a planar format.

3. The decoder system of claim 2, wherein the plurality of formats further comprise a packed format.

4. The decoder system of claim 1, wherein the feeder calculates at least one starting address for a second line in the display frame by incrementing the at least one starting address for the display frame.

5. The decoder system of claim 1, wherein the feeder calculates at least one starting address for a next line in the display frame by incrementing at least one starting address for a current line.

6. The decoder system of claim 1, wherein the circuit for selecting the increment selects:
　the line stride if the storage format of the video data is packed or planar; and
　the row stride if the storage format is the macroblock storage format and if the current line is a last line of a macroblock row.

7. The decoder system of claim 6, wherein the circuit for selecting the increment selects:
　the line stride for the macroblock storage format if the storage format is the macroblock storage format and if the current line is other than the last line of a macroblock row.

* * * * *